United States Patent Office 3,457,353
Patented July 22, 1969

3,457,353
NEMATOCIDES
Walter Hafner, Furth, near Deisenhofen, and Erwin Kopp and Karl Milles, Munich, Germany, assignors to Consortium fur Elektrochemische Industrie G.m.b.H., Munich, Bavaria, Germany, a corporation of Germany
No Drawing. Filed Jan. 12, 1967, Ser. No. 608,726
Claims priority, application Germany, Jan. 18, 1966, C 37,942
Int. Cl. A01m 9/12, 7/04
U.S. Cl. 424—315                         3 Claims

ABSTRACT OF THE DISCLOSURE

The invention provides nematocides which contain, as the active agent thereof, bisulfite compounds of monochloracetaldehyde, particularly sodium, calcium or potassium monochloracetaldehyde bisulfite.

---

This invention relates to controlling nematodes and it has for its object to provide a novel and effective means for combating such pests.

Among the nematodes living in the ground there are a number of plant parasites which may attack many cultivated plants, such as potatoes, beets, grain, beans, tomatoes, etc. The plants thus attacked start to wilt and their yield is reduced, so that frequently a direct attack on the nematodes in the ground is necessary. This can be done by spreading or working suitable control agents into the ground. It is simpler to get nematodes into the ground by pouring out solutions thereof. In order to employ the last-mentioned mode of application it is desirable that the nematocides should be water-soluble. Also important is low toxicity to warm-blooded animals. For economic reasons it is moreover advantageous if the substances can be made in a simple manner from easily obtainable materials. These various requirements are met in a high degree by the compounds of our invention.

German Patent No. 528,194 proposed to use for the destruction of insects in the ground, mono- or dichloracetaldehyde and their derivatives. Neither the free aldehydes nor the derivatives attained any practical significance during the past decades for combating insects.

We have discovered that the bisulfite adducts used in accordance with our invention differ considerably in their biological activity from the derivatives referred to in the above-mentioned German patent. They do not have any insecticide properties, but they have an excellent nematocide effect.

The bisulfite compounds, of which the sodium salt is particularly suitable, contrary to the free chloracetaldehyde, do not have any penetrating odor. They are water-soluble powders which can be used spread out or used in the form of solutions alone or together with other nematocide and property-changing additives or adjuvant agents.

For diffusing same, the agents of our invention can be combined with the customary carrier and accessory substances for pest control, e.g. talcum, kieselguhr, as well as wetting agents, fertilizers, etc. In such case we use preparations which contain, for instance, 2 to 97 weight percent of the effect material.

For solutions one may also use surface-active substances, like aliphatic alcohol sulfonates, as additives. Generally we use solutions with 1 to 40 weight percent bisulfite compounds, i.e. in such quantities which correspond to an active substance application of 60 to 150 grams per square meter of ground. It is useful to make the application 2 to 6 weeks before planting or sowing time.

Example 1

The effect of sodium monochloracetaldehyde bisulfite against plant parasite nematodes in the ground was determined on Meloidogyne spec. (Root gall nematodes) on tomatoe and lettuce plants, potted as well as planted in the open. For the surface tests, infected compost earth was treated with a 5% aqueous solution of sodium monochloracetaldehyde bisulfite in such a manner that 60 grams, 100 grams and 150 grams, respectively, of active substance were applied per square meter of ground. After a waiting period of four weeks, tomatoes and lettuce were planted. The plants showed a sound, good growth. The evaluation of the tests was done by examining the roots of the plants for gall formation after four, six and eight weeks. The following table shows the amount of infection after eight weeks. The figures denote the average quantity of galls formed on the roots of ten plants in each case.

| Quantity applied per sq. meter (g.) | Na-monochlor- acetaldehyde bisulfite | Control (untreated) |
|---|---|---|
| 0 | | 156.1 |
| 60 | 1.7 | |
| 100 | 0 | |
| 150 | 0 | |

Example 2

*Anguillula silusiae* were killed off 100% in 24 hours by 0.3% solutions of sodium monochloracetaldehyde bisulfite. No effect was achieved with solutions of chloracetaldehyde diethyl acetal of the same concentration.

Example 3

50 cysts of potato nematodes (*Heterodera rostochinensis*) were added to each pot of a test series of 10 pots. After treatment and corresponding waiting periods, the following mean values were found in animal life:

(1) Preparation: combination of 80 parts monochloracetaldehyde bisulfite and 20 parts pentachlorsodiumphenol as additive, 60 g./m.$^2$=40 larvae from 50 cysts.

(2) Preparation: (Comparison substance) 85% 3,5-dimethyl tetrahydro - 1,3,5 - thiadiazone, 50 g./m.$^2$=32 hatched larvae from 50 cysts.

(3) Control: the average content of the cysts (smaller and larger ones) was 245 larvae per cyst.

Example 4

Application of sodium monochloracetaldehyde bisulfite on Pratylenchus spp. on carrots (Nantaise special):

A 5% solution of sodium monochloracetaldehydebisulfite is applied by pouring. 2 liters per sq. meter are applied. One month after sowing the carrot seed 13 animals were found in 250 cu. cm. of the treated earth, while 713 animals were counted in untreated earth. Before treatment the number of animals in the earth was 668. There was no growth delay; the development of the carrots was considerably better than in untreated earth.

Example 5

Calcium and potassium monochloracetaldehydebisulfite also have a nematicide effect. Thus *Anguillula silusiae* were killed within 48 hours with a 1% solution.

The invention claimed is:
1. A method of protecting plants in the ground against nematodes which comprises applying to said nematodes a substance selected from the group consisting of sodium monochloracetaldehyde bisulfite, calcium monochloracetaldehyde bisulfite, and potassium monochloracetaldehyde bisulfite, the quantity of said subtance so applied being 60–150 g. per square meter of ground.

2. Method of claim 1, in which the substance is applied in the form of an aqueous solution containing 1–40 weight percent of the substance.

3. Method of claim 1, in which the substance is applied in the form of a composition which contains 2–97 weight percent of the substance.

References Cited

UNITED STATES PATENTS 3,149,152   9/1964   Boehme _____ 260—513

FOREIGN PATENTS 528,194   6/1931   Germany.

OTHER REFERENCES

Chemical Abstracts, vol. 51, 1957, p. 11645(C).
Beilstein, Handbook of Organic Chemistry, 4th edition (1918) vol. 1, p. 612.

ALBERT T. MEYERS, Primary Examiner
J. D. GOLDBERG, Assistant Examiner